Aug. 15, 1950
G. M. BAGNARD
2,518,443
QUICK DETACHABLE SWIVEL JOINT
Filed Feb. 18, 1948
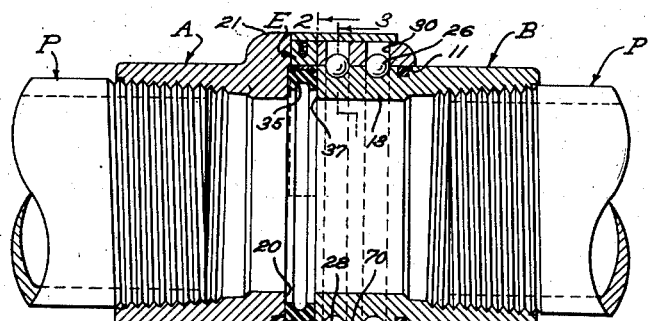
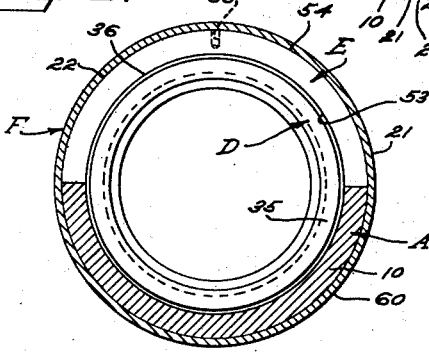
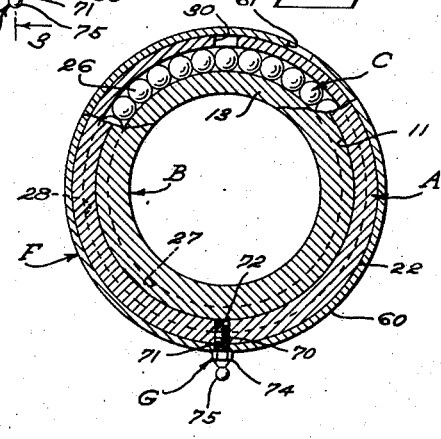
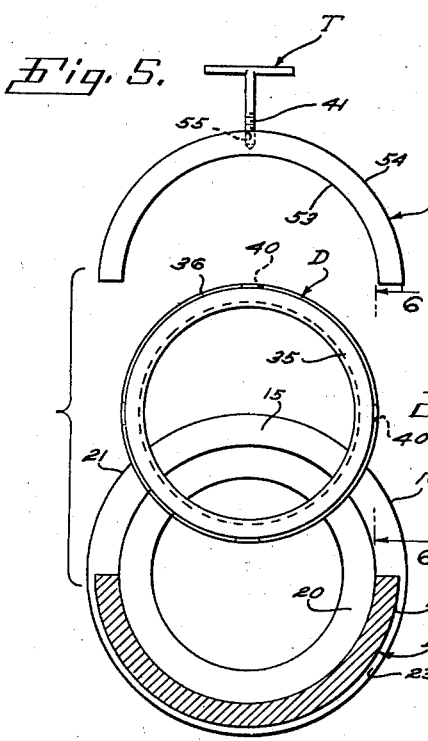
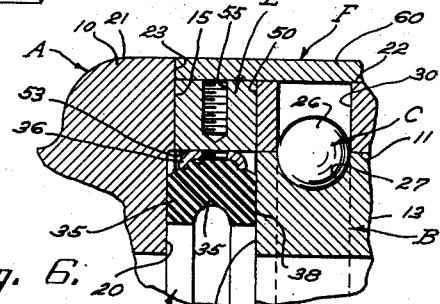
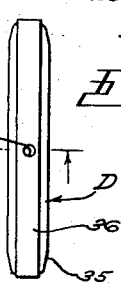
INVENTOR
GUS M. BAGNARD
BY
ATTORNEY Patented Aug. 15, 1950

2,518,443

UNITED STATES PATENT OFFICE 2,518,443

QUICK DETACHABLE SWIVEL JOINT

Gus M. Bagnard, Anaheim, Calif., assignor to Chiksan Company, Brea, Calif., a corporation of California Application February 18, 1948, Serial No. 9,099

11 Claims. (Cl. 285—97.3)

This invention relates to a quick detachable swivel joint and it is a general object of the invention to provide a simple, practical joint for fluid conductors, which joint employs packing to prevent leakage between the conductors renewable or replaceable without taking the joint apart, and it further involves a structure such that the several parts can be easily and quickly separated whenever desired.

Swivel joints are employed in fluid conductors or pipe lines handling various materials and are subject to a wide range of working conditions. In some cases the materials handled are corrosive or abrasive and, consequently, affect parts of the joint, particularly the packing. In other cases pressures or speeds of operation create conditions that adversely affect parts, particularly the packings. It is highly desirable in some cases that the parts be subject to rapid separation to facilitate cleaning and removal or inspection.

It is a general object of the present invention to provide a joint construction for handling fluids and including a packing between the relatively movable elements, which packing can be easily and quickly removed or replaced without disturbing the mechanical couple joining the elements.

Another object of the invention is to provide a construction of the general character referred to in which a quick removable packing is provided in combination with easily removable antifriction bearing means that couples the relatively rotatable elements, which packing and bearing means are retained in working position by a single member.

A further object of the present invention is to provide a construction of the general character referred to in which packing is located to operate in a most advantageous manner and yet is accessible from the exterior of the structure for removal or replacement without separation or manipulation of the principal coupled elements or fluid conducting parts.

A further object of the present invention is to provide a construction of the general character referred to in which but one part needs to be separated or detached from the structure as a whole in order to render the packing accessible for removal or replacement.

Another object of the invention is to provide a structure of the general character referred to involving a single unitary arcuate insert that is retained by a single retaining sleeve, but which normally occupies the access opening through which the packing is removable.

A further object of the present invention is to provide a construction of the general character referred to in which the arcuate insert that occupies the access passage is engageable by a suitable tool so it can be handled easily and quickly.

Another object of the present invention is to provide a packing ring and insert movable into and out of working position in a joint construction through a lateral passage in one of the connected elements, which ring and insert are engageable by a suitable tool so they can be handled easily and quickly.

The various objects and features of my invention will be fully understood from the following detailed description of a typical preferred form and application of the invention, throughout which description reference is made to the accompanying drawings, in which:

Fig. 1 is a longitudinal sectional view of a joint construction provided by the present invention showing it connected between two pipe sections. Fig. 2 is a transverse sectional view taken as indicated by line 2—2 on Fig. 1. Fig. 3 is a transverse sectional view of the structure taken substantially as indicated by line 3—3 on Fig. 1. Fig. 4 is an enlarged detailed sectional view of a portion of Fig. 1. Fig. 5 is a view of certain parts of the structure such as are shown in Fig. 2 of the drawings, illustrating them separated or apart. Fig. 6 is a side or edge view of the packing unit employed in the construction, and Fig. 7 is an enlarged transverse sectional view of the packing unit in its normal expanded position, being a view taken as indicated by line 7—7 on Fig. 6.

The construction provided by the present invention is such that it can be used to advantage in swivel connections of various styles or forms. However, it can be used to particular advantage in connecting fluid conductors or fluid conducting elements. In the case illustrated it is used in connection with two tubular elements A and B and these elements are shown joined to pipe sections P. The sections A and B may be of various sizes and shapes, that is, they may be angular or simple straight tubular parts. In the drawings they are shown as simple straight tubular parts of limited axial extent, making the joint or swivel connection a simple, compact structure.

The element A is a female element or section of the structure and involves an enlarged inner or main end portion 10 having a socket opening 11 formed therein, and having an outer end portion 12 to which a pipe section P is connected. The element B is a male part or male section having an inner end portion or spindle part 13 that enters the socket opening 11 of section A and having an outer end portion 14 to which a pipe section P connects. The outer end portions 12 and 14 of the parts or sections A and B are shown as internally threaded to receive the ears of the pipe sections P.

The construction provided by the present invention involves, generally, the sections A and B above referred to, bearing means C coupling the sections and rotatably supporting them one from the other, packing means D preventing leakage between the sections, an insert E normally occupying an access opening 15 through which the packing means is inserted into operating position, a retainer F for the insert E and the bearing means C, and lock means G for the retainer.

The body portion 10 of the female section A has the socket opening 11 entering it from its outer or free end and the opening or socket 11 is preferably a simple, straight bore extending into the body 10 and terminating in a bottom or shoulder 20, the plane of which is normal to the longitudinal axis of the structure. The exterior 21 of the body 10 is turned or reduced somewhat in diameter at 22 forming a part on which the retainer F is carried. A shoulder 23 is formed by the reduced part 22 and in the preferred arrangement of parts the retainer is stopped or bears against the shoulder 23, as will be apparent from the drawings.

The male section B may be a simple tubular part and in the case illustrated the spindle portion 13 and coupler portion 14 are of the same external diameter, the spindle part 13 being a simple turned part that fits the socket opening 11 for rotation therein. A small recess is provided in the exterior of the spindle 13 near the outer end or mouth of the socket opening to carry a sealing ring 25.

The bearing means C couples the sections A and B against separation and provides an antifriction bearing between the sections. In the preferred form of the invention the means C involves one or more rows of balls 26. In the case illustrated there are two axially spaced rows of balls 26, the exterior of the spindle 13 of section B being provided with grooves 27 that register with grooves 28 in the wall of the bore 11 forming channels that carry the balls. In accordance with the present invention access openings or passages 30 extend from the ball carrying channels to the exterior of body 10 of section A and are of such size as to allow the balls to be passed into and out of position in the channels. In accordance with the preferred arrangement there is one access opening or passage 30 for each ball carrying channel and the passages open at the reduced portion 22 of the body 10.

The packing means D may, in accordance with the broader principles of the invention, be of any suitable form or character. It is preferred that the packing means involve a single unitary packing member or element such as a packing ring. The particular ring illustrated in the drawings involves an annular body 35 of deformable material and a frame 36 on or in connection with the body 35. In practice it is ordinarily desirable to form the body 35 of rubber or rubber-like material.

In the particular case illustrated the packing ring when in place is between the bottom 20 of the socket in section A and the inner end 37 of the spindle part 13 of section B. In such case it is desirable that the body 35 of the packing ring have inwardly projecting lip portions 38 which are normally divergent, as shown in Fig. 7 and which, therefore, have bearing or pressure engagement with the bottom 20 and end 37 when in operating position as shown in Fig. 4.

The frame 36 of the packing unit is preferably a metal ring that surrounds or is engaged with the exterior of the body 35. A feature of construction provided by the present invention is one or more openings 40 in the frame of the packing unit engageable by a suitable tool to facilitate handling of the packing unit. In the particular case illustrated there are several openings 40 circumferentially spaced around the frame and each opening is threaded to receive the threaded shank 41 of a suitable operating tool T. A suitable handle may be provided on the outer end of the shank 41.

The present invention provides means whereby the packing ring above described may be arranged in and removed from operating position without disengagement of the spindle 13 from socket 11. To facilitate such operation a laterally extending access opening 15 is provided in the body 10 of section A which access opening enters from one side of the body 10 and extends about half-way through the body, as shown in Figs. 1, 2 and 5 of the drawings. In accordance with my invention the access passage or opening 15 is made wide enough axially of the structure to pass the packing ring into and out of position and it is preferred that it be formed so that it has one wall 50 coincidental with the end 37 of the spindle 13 so that the packing ring will slide freely over these parts without danger of injury.

The insert E provided by the present invention is an arcuate or segmental member substantially semi-circular in form and of such extent axially and radially as to occupy the access opening or passage 15 when in operating position, as shown in Figs. 1, 2 and 4 of the drawings. When the insert is in operating position its inner wall 53 registers with and forms a continuation of the wall of the bore 11 while its outer wall 54 registers with and forms a continuation of the wall of the body part 22.

It will be apparent that when the insert is in position it serves to positively retain the packing ring in operating position concentrically in the structure between the shoulder or bottom 20 and the end 37. A feature of the insert E is the provision of an opening 55 therein for the reception of a handling tool. In the case illustrated the opening 55 is shown threaded to receive the shank 41 of the operating tool T. The opening 55 may be the same size and threaded the same as the opening 40 in the frame of the packing ring so that a single operating tool can be used for handling both of these parts.

The retainer F is preferably a single simple tubular part or sleeve 60 shiftably supported on the exterior of the body 10, preferably on the reduced or turned part 22, as shown throughout the drawings. It is preferred also that the retainer sleeve 60 be such as to retain both the insert E and the balls 26 of the bearing means C. It will be apparent from the drawings how the sleeve 60 may readily be made of sufficient axial extent to simultaneously cover the access openings 30 and also the access passage 15 as shown in Fig. 1 of the drawings.

The sleeve 60 is intended to be shifted axially on the body 10 to uncover or release the insert E for separation from the structure and it may also be shifted axially to uncover the access openings 30.

In the particular case illustrated the sleeve 60 is provided with ports 61 shiftable into and out of register with the access openings 30 while the sleeve is maintained in position retaining the insert F in operating position. With this construction the sleeve 60 can be rotated as between the position shown in Fig. 3 and a position where the port 61 registers with opening 30 by mere rotation of the sleeve and without shifting it axially. It is to be understood, of course, that the ports 61 are made large enough so that when they are registered with the openings 30 the balls can be readily passed into and out of operating position in the structure.

The locking means G preferably involves a single part or member such as an elongate threaded part 70 normally engaged in an opening 71 in the sleeve 60 and an opening 72 in the body 10. When the openings 71 and 72 register they receive the member 70 and the ports 61 are out of register with the openings 30. In the preferred construction the member 70 is threaded into both the opening 71 and the opening 72 and when it is desired to operate the retainer 60 the member 70 is disengaged from opening 72 leaving it projecting only from the exterior of the sleeve 60 forming a convenient operating handle.

In practice it is preferred that the member 70 be tubular so that it may be used to conduct lubricant to the balls confined in the structure. In the preferred form of construction illustrated a head 74 is provided on the outer end of members 70 to receive an operating tool and a head 75 is provided to receive lubricant handling equipment.

Certain aspects of the construction above described and particularly the bearing means involving the balls to be passed into and out of position through the access opening 30 and the sleeve controlling the access openings and locked by the member 70, are more fully described and are claimed as such in my copending application entitled "Ball Type Swivel Connection," Serial Number 9,098, filed on even date herewith now Patent No. 2,512,006, issued on June 20, 1950.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A joint construction of the character described including, a female section having a socket entering it from one end and having a lateral access opening extending from the exterior of the section to the socket, a male section with a spindle part entering the socket, means rotatably coupling the sections with the spindle part in the socket, a packing unit insertable into the socket through the access opening and normally sealing between the sections, an insert separable from said sections and from the packing unit and normally occupying the access opening, the insert being confined to the access opening and being removable therefrom for passage of the packing unit through the opening, and means releasably retaining the insert in the opening.

2. A joint construction of the character described including, a female section having a socket entering it from one end and having a lateral access opening extending from the exterior of the section to the socket, a male section with a spindle part entering the socket, balls engaged between the spindle part and socket rotatably coupling the sections with the spindle part in the socket, an annular packing unit insertable into the socket through the access opening to be entirely within the socket and normally sealing between the sections, a segmental insert normally occupying the access opening and overlying the packing unit to confine it in the socket, the insert being removable from the access opening for passage of the packing unit through the opening, and means releasably retaining the insert in the opening.

3. A joint construction of the character described including, a female section having a socket entering it from one end and having a lateral access opening extending from the exterior of the section to the socket, a male section with a spindle part entering the socket, means rotatably coupling the sections with the spindle part in the socket, an annular packing unit of uniform cross sectional configuration and insertable into the socket through the access opening and normally sealing between the sections, a semicircular insert separate from the said sections and from the packing unit and normally occupying the access opening, the insert being removable from the opening for passage of the packing unit through the opening, the interior of said insert being of such curvature as to seat on the exterior of the packing unit, and means releasably retaining the insert in the opening.

4. A joint construction of the character described including, a female section having a socket entering it from one end and having a lateral access opening extending from the exterior of the section to the socket, a male section with a spindle part entering the socket, means rotatably coupling the sections with the spindle part in the socket, an annular packing unit insertable into the socket through the access opening and normally sealing between the sections, an insert normally occupying the access opening to retain the packing unit and removable from the opening for passage of the packing unit through the opening, and means releasably retaining the insert in the opening, the packing unit including a ring of rubber and a reinforcing frame, the frame having a threaded tool receiving opening.

5. A joint construction of the character described including, a female section having a socket entering it from one end and having a lateral access opening extending from the exterior of the section to the socket, a male section with a spindle part entering the socket, balls in the socket retaining the spindle part in the socket for rotation therein, there being a ball passing port in the female section from said means to the exterior of the female section, a packing ring in the socket between the bottom of the socket and the inner end of the spindle part and insertable into position through the access opening, an insert normally occupying the access opening and retaining the packing ring in the socket, and a single member carried by the female section normally closing the access opening and the port.

6. A joint construction of the character described including, a female section having a socket entering it from one end and having a lateral access opening extending from the exterior of the section to the socket, a male section with a spindle part entering the socket, there being registering grooves in the spindle part and socket forming an annular channel between the sections, balls in the channel, there being a port in the female section from the channel to the exterior of the female section for passing the balls, a packing ring in the socket between the bottom of the socket and the inner end of the spindle part and insertable into position through the access opening, an insert normally occupying the access opening, and a sleeve shiftable on the female section and normally closing the access opening and the port.

7. A joint construction of the character described including, a female section having a socket entering it from one end and having a lateral access opening extending from the exterior of the section to the socket, a male section with a spindle part entering the socket, there being registering grooves in the spindle part and socket forming an annular channel between the sections, balls in the channel, there being a port in the female section from the channel to the exterior of the female section for passing the balls, a packing ring in the socket between the bottom of the socket and the inner end of the spindle part and insertable into position through the access opening, an insert normally occupying the access opening, and a sleeve slidably and rotatably carried on the exterior of the female section normally covering the access opening and shiftable axially of the female section to uncover the opening and having a port movable into register with the port in the female section by rotation of the sleeve on the female while the sleeve covers the access opening section.

8. A joint construction of the character described including, a female section having a socket entering it from one end and having a lateral access opening extending from the exterior of the section to the socket, a male section with a spindle part entering the socket, means rotatably coupling the sections with the spindle part in the socket, a packing unit insertable into the socket through the access opening and normally sealing between the sections, an insert normally occupying the access opening removable therefrom for passage of the packing unit through the opening, a sleeve shiftable on the exterior of the female section and normally retaining the insert in the opening, and a lock member releasably holding the sleeve in said position.

9. A joint construction of the character described including, a female section having a socket entering it from one end and having a lateral access opening extending from the exterior of the section to the socket, a male section with a spindle part entering the socket, means rotatably coupling the sections with the spindle part in the socket, a packing unit insertable into the socket through the access opening and normally sealing between the sections, an insert normally occupying the access opening removable therefrom for passage of the packing unit through the opening, a sleeve shiftable on the exterior of the female section and normally retaining the insert in the opening, and a lock member releasably holding the sleeve in said position, said member being held by a thread and having a passage through it to admit lubricant to the structure.

10. A joint construction of the character described including, a female section having a socket entering it from one end and having a lateral access opening extending from the exterior of the section to the socket, a male section with a spindle part entering the socket, means rotatably coupling the sections with the spindle part in the socket, an annular packing unit with concentric inner and outer walls and insertable into the socket through the access opening and normally sealing between the sections, a rigid semicircular insert normally occupying the access opening removable therefrom for passage of the packing unit through the opening, a sleeve shiftable on the exterior of the female section and normally retaining the insert in the opening, and a lock member releasably holding the sleeve in said position, said member being a lubricant handling fitting threaded to the female section and also to the sleeve.

11. An annular packing unit including, an annular body of packing material, and a frame extending continuously around the outer periphery of the body and having a threaded tool receiving opening therein, the axis of the opening being radial of the unit.

GUS M. BAGNARD.

REFERENCES CITED

The following references are of record in the file of this patent:

UNITED STATES PATENTS

| Number | Name | Date |
|---|---|---|
| 839,000 | Sparrow | Jan. 1, 1907 |
| 1,056,762 | McGahan | Mar. 18, 1913 |
| 1,635,259 | Critchley | July 12, 1927 |
| 1,844,047 | Smittle | Feb. 9, 1932 |
| 2,253,932 | Gilkerson | Aug. 26, 1941 |
| 2,312,341 | King | Mar. 2, 1943 |
| 2,396,123 | Phillips | Mar. 5, 1946 |